United States Patent
Liess et al.

(10) Patent No.: US 6,872,931 B2
(45) Date of Patent: Mar. 29, 2005

(54) OPTICAL INPUT DEVICE FOR MEASURING FINGER MOVEMENT

(75) Inventors: Martin Dieter Liess, Eindhoven (NL); Christoph Dobrusskin, Eindhoven (NL); Aldegonda Lucia Weijers, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 298 days.

(21) Appl. No.: 10/169,461
(22) PCT Filed: Nov. 6, 2001
(86) PCT No.: PCT/EP01/12990
§ 371 (c)(1), (2), (4) Date: Jul. 2, 2002
(87) PCT Pub. No.: WO02/37411
PCT Pub. Date: May 10, 2002

(65) Prior Publication Data
US 2003/0006367 A1 Jan. 9, 2003

(30) Foreign Application Priority Data
Nov. 6, 2000 (EP) .............................. 00203875

(51) Int. Cl.$^7$ ................................ H01J 40/14
(52) U.S. Cl. ............... 250/221; 435/156; 435/157; 435/160; 435/167; 435/168
(58) Field of Search ................ 435/157, 156, 435/160, 167, 168; 250/221

(56) References Cited

U.S. PATENT DOCUMENTS

| | | | | |
|---|---|---|---|---|
| 5,803,729 A | * | 9/1998 | Tsimerman | ............... 433/29 |
| 6,099,541 A | * | 8/2000 | Klopotek | ............... 606/166 |
| 6,168,814 B1 | * | 1/2001 | Long | ............... 426/238 |
| 6,275,634 B1 | * | 8/2001 | Potucek | ............... 385/115 |
| 6,391,400 B1 | * | 5/2002 | Russell et al. | ............... 428/34 |
| 6,552,713 B1 | * | 4/2003 | Van Brocklin et al. | ..... 345/157 |

* cited by examiner

Primary Examiner—John R. Lee
Assistant Examiner—Erin-Michael Gill

(57) ABSTRACT

An optical input device for measuring the movement of a finger (15) ia accommodated in a housing provided with a transparent window (12) for transmitting a measurement beam (13) from a diode laser (3) to the finger and radiation reflected by the finger to a detector (4). This feature prevents that grease and dust disturb and block the measuring beam.

18 Claims, 12 Drawing Sheets

OPTICAL INPUT DEVICE FOR MEASURING FINGER MOVEMENT

The invention relates to an optical input device for measuring finger movement along at least one measuring axis, which device comprises a module provided with a transparent window and accommodating at least one laser for generating a measuring beam, optical means for converging the measuring beam in an action plane and converting means for converting measuring beam radiation reflected by the finger into an electrical signal, which is representative of the movement along said measuring axis.

The invention also relates to apparatus comprising such an optical input device.

An action plane is understood to mean a plane wherein the measuring beam meets the finger and is influenced by a finger movement. In most circumstances the action plane will be the plane through the top of the window, but it may also be a plane near this window.

An optical input device as defined is known, for example from European patent application EP-A 0 942 285. This document describes an optical mouse, which is used in a computer configuration to move a cursor across the computer display or monitor, for example to select a function of a displayed menu. Currently, such an optical mouse is moved across a mouse pad by hand, like the conventional mechanical mouse. In EP-A 0 942 285 it also proposed to use optical device as "inverted" optical mouse. The optical device is then stationary and, for example, built in the keyboard of a desktop or notebook or palm computer and a human finger is moved across a transparent window in the housing of the optical device. In the latter case, the input device may be small, because the optical module for measuring the finger movement can be made very small. In fact, the input device is reduced to the optical measuring module. This opens the way to new applications for the input device. For example, an input function can be built in a mobile phone for selecting functions on a menu and for accessing Internet pages, in a remote control device for a TV set for the same purposes or in a virtual pen. The optical measuring device of EP-A 0 942 285 comprises a flat window. Such a flat window will cause problem in practical use of the finger controlled input device.

It is an object of the present invention to solve these problems and to provide a user's friendly finger controlled optical input device, which is very suitable for use also in non-ideal circumstances.

This optical input device is characterized in that the upper surface of the window is convex in at least one of two mutually perpendicular directions in an action plane on top of window.

The invention is based on the recognition that putting a finger on a flat window will be problematic because the user should kept his eyes to the display so that he can not look at the surface wherein the window is embedded. Moreover, in bad light circumstances the window will be hardly discernable by the eyes. Another recognition is that dust and dirt particles may gather on the window and especially on its central part, where the measuring beam(s) should pass. The dust and dirt will have an impact on the measuring beam(s) and thus will influence the measurement results and in the worst case the will made measurements impossible. If, according to the invention, the window has a convex surface shape it at least one direction, it can be kept clean, especially in its central part where the measuring beam(s) pass(es). Moreover, the window is now tangible so that it can be found by the finger itself and thus also in the dark.

A first embodiment of the optical input device is characterized in that the window is convex in both of the two directions.

The two-dimensional convex surface not only resembles a regular lens surface, but the window surface can also be given a lens function.

An embodiment of the optical input device, which is preferred in view of the capabilities of the window, is characterized in that the window is convex in one of the directions and concave in the other direction.

It may now be arranged that the direction in which the window surface is convex, or the direction on which this surface is concave, hereinafter the convex and the concave direction, respectively, is parallel to an axis of measuring. The user thus knows in which direction the finger should be moved to activate a given function, for example scrolling a menu or a file.

The optical input device may be further characterized in that the refractive index of the window upper surface is close to that of water.

This feature allows reducing the effect of scratches in the window surface, which may caused by wearing and continuous use in non-ideal circumstances. The human finger exudes a substance mainly consisting of water and if the finger is put on the window surface this water fills scratches present in the surface. The closer the refractive index of the surface material is to the refractive index of water, the smaller the effect on the measuring beam of scratches will be.

Another possibility to reduce the effect of scratches and of residual dust and dirt particles on the measuring beam(s) is realized in an embodiment of the input device, which is characterized in that the measuring beam is focused in a plane remote from the upper surface of the window. As the measuring beam is focussed below or above the window surface, the cross-section of this beam at the position of this surface is considerable larger than the size of a dust or dirt particle so that this particle can have only little influence on the beam.

The invention can be used in any finger-controlled optical input device having a transparent window, such as the "inverted" optical mouse disclosed in EP-A 0 942 285. In this device homodyne or heterodyne detection is used. Use is made of a diffraction grating, which is arranged close to the module window. The grating reflects a portion of the measuring beam radiation, preferably radiation diffracted in one of the first orders, to a detector which also receives a portion of the radiation reflected and scattered by the finger. The laser radiation diffracted in the first order by the grating is denoted a local oscillator beam, and the detector coherently detects the radiation from the finger using this local oscillator beam. The interference of the local oscillator beam and the radiation reflected by the finger reaching the detector give rise to a beat signal from the detector, which signal is determined by the relative motion of the finger in its own plane. The optical measuring module of EP-A 0 942 285 comprises, besides the grating, a collimator lens, a focusing lens and a pinhole diaphragm, preceding the detector, which elements should be aligned very accurately. This complicates the manufacture and increases the costs of the module, which is intended to be a mass consumer product.

A preferred embodiment of the optical input device as described herein above is based on another measuring principle, comprises fewer components, is more compact and more easily to manufacture. This optical input device is characterized in that the converting means are constituted by the combination of the laser cavity and measuring means for measuring changes in operation of the laser cavity, which are due to interference of reflected measuring beam radiation re-entering the laser cavity and the optical wave in this cavity and are representative of a relative movement of a finger and the input device.

This optical input device uses the so-called self-mixing effect in a diode laser. This is the phenomenon that radiation emitted by a diode laser and re-entering the cavity of the diode laser induces a variation in the gain of the laser and thus in the radiation emitted by the laser. The finger and the input device are moved relative to each other such that the direction of movement has a component in the direction of the laser beam. Upon movement of the finger and the input device, the radiation scattered by the object gets a frequency different from the frequency of the radiation illuminating the object, because of the Doppler effect. Part of the scattered light is focused on the diode laser by the same lens that focuses the illumination beam on the finger. Because some of the scattered radiation enters the laser cavity through the laser mirror, interference of light takes place in the laser. This gives rise to fundamental changes in the properties of the laser and the emitted radiation. Parameters, which change due to the self-coupling effect, are the power, the frequency and the line width of the laser radiation and the laser threshold gain. The result of the interference in the laser cavity is a fluctuation of the values of these parameters with a frequency that is equal to the difference of the two radiation frequencies. This difference is proportional to the velocity of the finger. Thus the velocity of the finger and, by integrating over time, the displacement of the finger can be determined by measuring the value of one of said parameters. This method can be carried out with only a few and simple components and does not require accurate alignment of these components.

The use of the self-mixing effect for measuring velocities of objects, or in general solids and fluids, is known per se. By way of example, reference is made to the article: "Small laser Doppler velocimeter based on the self-mixing effect in a diode laser" in Applied Optics, Vol. 27, No. 2, Jan. 15, 1988, pages 379–385, and the article: "Laser Doppler velocimeter based on the self-mixing effect in a fibre-coupled semiconductor laser: theory" in Applied Optics, Vol.31, No.8, Jun. 8, 1992, pages 3401–3408. However, up to now, use of the self-mixing effect in a finger-controlled input device as defined above has not been suggested. This new application is based on the recognition that a measuring module using the self-coupling effect can be made so small and cheap that it can be installed easily and without much additional cost in existing devices and apparatus.

An embodiment of the optical input device, which allows measuring a movement and determining the direction of the movement is characterized in that it comprises electronic means for determining the shape of the signal, which represents the variation in operation of the diode laser cavity.

This signal is an asymmetric signal and the asymmetry for a forward movement is different from the asymmetry for a backward movement.

For applications where it is difficult to determine the asymmetry of the self-mixing signal, another embodiment of the optical input device may be used. This embodiment is characterized in that it comprises laser drive means for supplying a periodically varying electrical current to the diode laser and electronic means for comparing first and second measuring signals with each other, which first and second measuring signals are generated during alternating first half periods and second half periods, respectively.

The wavelength of the radiation emitted by a diode laser increases, and thus the frequency of this radiation decreases, with increasing temperature, thus with increasing current through the diode laser. A periodically varying current through the diode laser in combination with radiation from the object re-entering the laser cavity results in a number of radiation pulses per half period and thus in a corresponding number of pulses in the measured signal. If there is no relative movement of the input device and the object, the number of signal pulses is the same in each half period. If the device and the object move relative to each other, the number of pulses in one half period is larger or smaller than the number of pulses in the next half period, depending on the direction of movement. By comparing the signal measured during one half period with the signal measured during the next half period, not only the velocity of the movement but also the direction of the movement can be determined.

The optical input device may comprise different measuring means for determining changes in the operation of the laser cavity.

A first embodiment of the optical input device is characterized in that the measuring means are means for measuring a variation of the impedance of the laser cavity.

A preferred embodiment of the optical input device is characterized in that the measuring means is a radiation detector for measuring radiation emitted by the laser.

The radiation detector may be arranged in such a way that it receives part of the radiation of the measuring beam.

This embodiment of the optical input device is, however, preferably characterized in that the radiation detector is arranged at the side of the laser cavity opposite the side where the measuring beam is emitted.

Generally, diode lasers are provided with a monitor diode at their rear side. Usually, such a monitor diode is used to stabilize the intensity of the laser beam emitted at the front side of the diode laser. According to the invention, the monitor diode is used to detect changes in the laser cavity, which are generated by radiation of the measuring beam re-entering the laser cavity.

The number of measuring axes and the orientation of these axes is determined by the functions to be performed by the optical input device.

An embodiment of the optical input device for measuring a finger movement along a measuring axis in the action plane or along a measuring axis perpendicular to the action plane is characterized in that it comprises one diode laser and one detector.

An embodiment of the optical input device for determining a finger movement along a measuring axis in the action plane and a finger movement along a measuring axis substantially perpendicular to the action plane is characterized in that it comprises at least two diode lasers and at least one detector.

An embodiment of the optical input device for determining finger movement along a first and a second measuring axis in the action plane is characterized in that it comprises two diode lasers and at least one detector.

An embodiment of the optical input device for determining finger movement along a first and second measuring axis in the action plane and a third measuring axis substantially perpendicular to the action plane is characterized in that it comprises one diode lasers and at least one detector.

An embodiment of the optical input device allows determining both a scroll action and a click action. A scroll action is understood to mean an up down, or down up, movement of a cursor across a menu chart. Such an action can be realized by moving a finger in a given direction across the window of the input device. A click action is understood to mean activating a menu pointed at by a cursor. A click action can be realized by a single movement of the finger in a direction perpendicular to the action plane. This embodiment is characterized in that it comprises two diode lasers and at least one detector for determining finger movement along a first measuring axis in the action plane and a second measuring axis substantially perpendicular to the action plane.

Alternatively, the embodiment for determining both a scroll action and a click action is characterized in that it comprises two diode lasers and at least one detector for determining finger movement along a first and a second measuring axis, which axis are at opposite angles with respect to a normal to the action plane.

The input device with one or two measuring axis may also be used for performing other measurements than determining scroll and/or click actions As will be explained later on, this device and other devices utilizing two or more measuring beams may be provided with a separate detector for each measuring beam. However, it is also possible to use one and the same detector for all measuring beams if time-sharing is used.

With respect to the constructional aspect, the input device may have several embodiments. A first embodiment is characterized in that the optical means comprises a lens arranged between said at least one diode laser and associated detector on the one hand, and an action plane, on the other hand, the at least one diode laser being positioned eccentrically with respect to the lens.

The lens may be a rotationally symmetric lens or may have another shape. Due to the eccentric position of the diode laser(s) with respect to the lens element, it is ensured that a measuring beams is incident on the window of the device at an acute angle so that this beams has a component along the associated measuring axis. For the following explanation, the term optical axis is introduced, which is understood to mean the symmetry axis of the lens, or the module, which axis is perpendicular to the window of the module.

An embodiment of the optical input device comprising such a lens and two diode lasers may be further characterized in that the diode lasers are arranged such that the lines from their centers to the optical axis of the lens are at an angle of substantially 90° with respect to each other.

Such an embodiment comprising three diode lasers may be characterized in that the diode lasers are arranged such that the lines from their centers to the optical axis of the lens are at an angle of substantially 120° with respect to each other.

In the optical input device a diode laser of the type VCSEL (vertical cavity surface emitting laser) may be used. Such a laser emits radiation in the vertical direction, which makes it suitable for the present device. However, currently such a laser is quite costly, it is not very suitable for consumer mass products.

For this reason, preference is given to an input device which is characterized in that each diode laser is a horizontal emitting laser and in that the device comprises, for each diode laser, a reflecting member reflecting the beam from the associated diode laser to an action plane.

Horizontal emitting diode lasers are the most commonly used lasers and are much cheaper than a VCSEL. Providing the device with a reflecting member adds little to the costs of this device.

An embodiment of the input device, which can be manufactured relatively easily and at low cost, is characterized in that it is composed of a base plate on which the at least one diode laser and associated detector are mounted, a cap member fixed to the base plate and comprising the window and a lens accommodated in the cap member.

This embodiment is composed of only three portions, which can be assembled easily and without severe alignment requirements.

An embodiment of the input device, which is even easier to manufacture, is characterized in that the lens is integrated in the cap member having an internal surface which is curved towards the base plate.

This embodiment is composed of only two portions.

These embodiments are preferably further characterized in that the base plate, the cap member and the lens are made of a plastic material.

Components made of such a material may be cheap and low weight and thus are suitable for consumer products. Only the material of the lens or window should be transparent and have some optical quality.

An alternative embodiment, i.e. without a lens, is characterized in that each diode laser is coupled to the entrance side of a separate light guide, the exit side of which is positioned at the window of the device.

In this embodiment, the radiation of an illumination beam is well isolated from its surroundings so that cross talk between the movements along different axes is eliminated or strongly reduced.

This embodiment is preferably characterized in that the light guides are optical fibres.

Optical fibres are flexible, have a small cross-section and show little attenuation per length unit and thus allow location of the window of the device at a larger distance from the diode lasers and the detectors.

The input device may be used in different applications, such as in a mouse for a desktop computer, in a keyboard of a desktop or laptop computer, in a remote control unit for different apparatus, in a mobile phone, etceteras.

These and other aspects of the invention are apparent from and will be elucidated, by way of non-limitative example, with reference to the embodiments described hereinafter. In the drawings.

Figure 1:
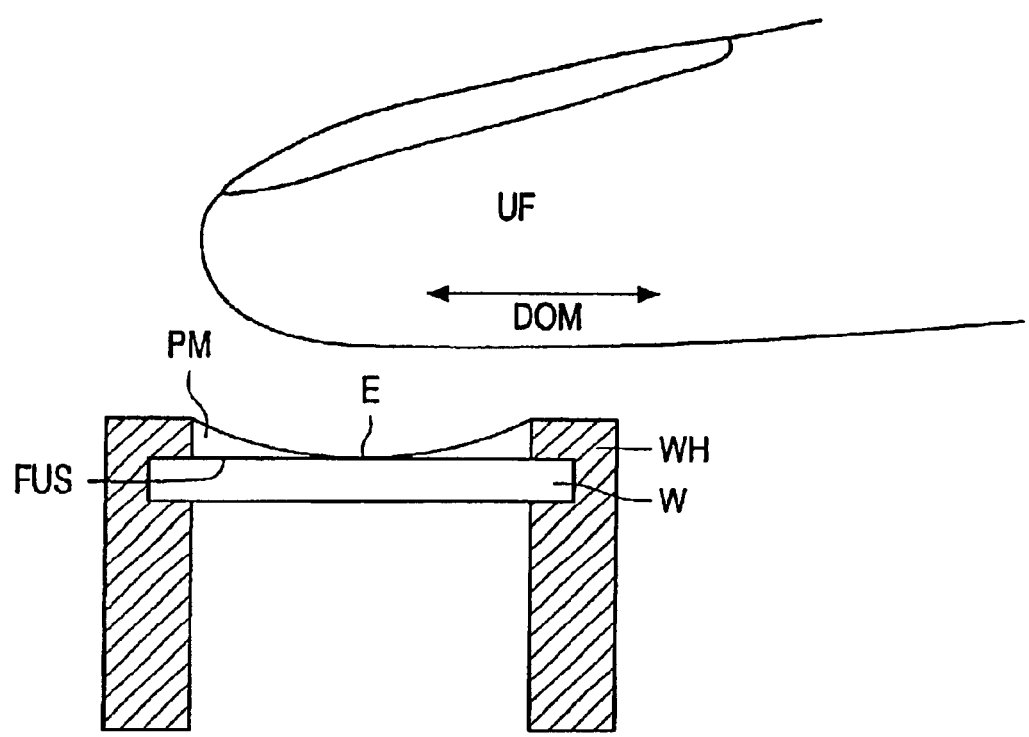
FIG. 1 shows a portion of an optical input device having a flat window.

FIG. 1 shows a vertical cross-section of a portion of a finger-controlled optical input device ID, including window W having a flat upper surface FUS. The window is fixed in a window holder WH, which forms part of the housing of the device or module. Also shown is a user's finger, UF, which is moved across the window in the direction of the arrow, denoted by DOM. The optical components of he device are not shown in FIG. 1, but in FIG. 4 and following Figs, which show different embodiments of the internal design of the input device. As indicated by the mass PM, dirt and dust particles and grease may gather on the flat window, also on the central portion C of the window where the measuring beam from the device and radiation reflected by the finger should pass. The mass of particle and grease will absorb and scatter radiation in a non-controllable way so that the measurement performed by the device will be influenced by the mass M. In the worst case this mass will absorb all measuring radiation so that measurement is not possible at all.

Figure 2:
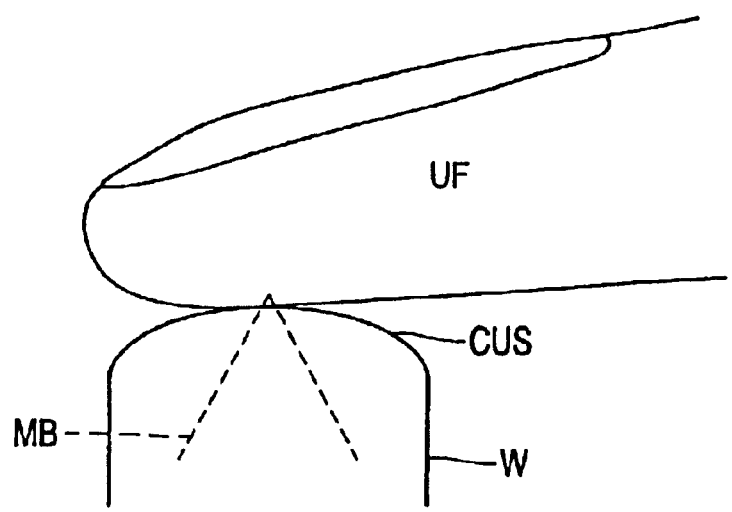
FIG. 2 shows a first embodiment of a window according to the invention for such a device.

According the present invention, this problem is eliminated by replacing the flat upper surface by a convex upper surface CUF, as shown in FIG. 2. Now, particles and grease, which may precipitate on the window surface, will be removed from the central portion and under favourable conditions from the whole surface by finger actions. The window will remain clean and thus will show sufficient transmission and a sufficient low degree of scattering. The new problem is thus solved in a very efficient way by simple means.

Figure 3:
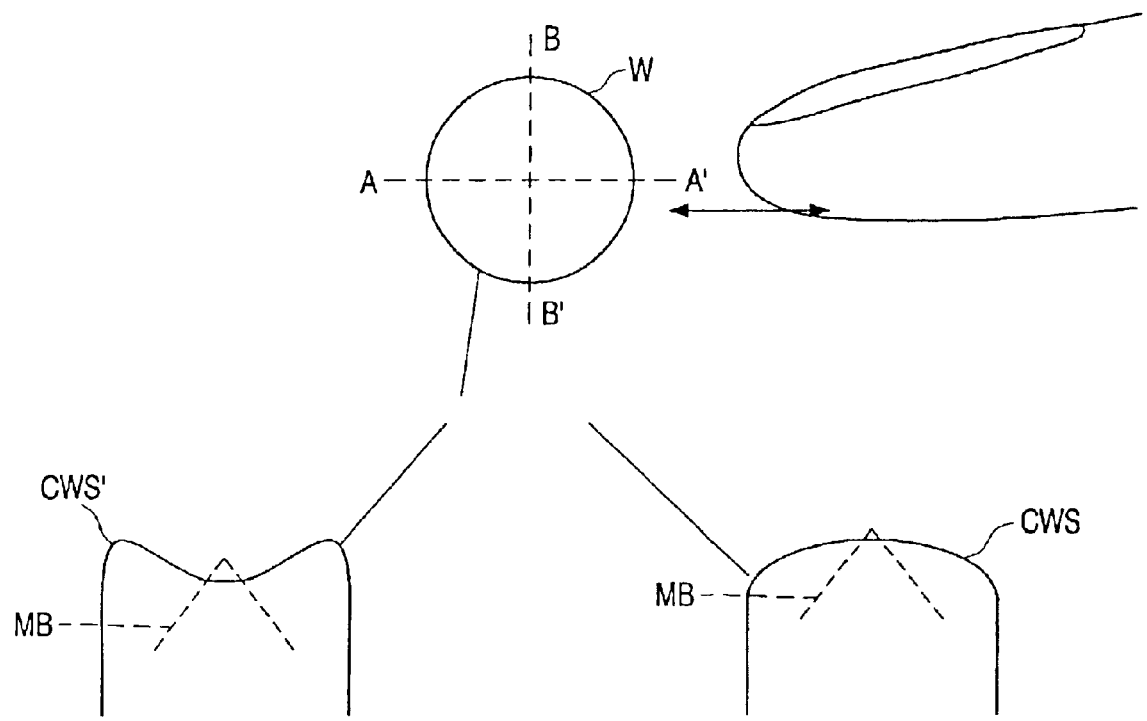
FIG. 3 shows a second embodiment of the window according to the invention.

The surface may be convex also in the direction perpendicular to the plane of drawing of FIG. 2. A window with such a two-dimensional convexity resembles a regular, for example plane-convex lens. This may be taken into consideration when designing the input device so that this window may be given a lens function, which allows reducing the number of components of the input device. Alternatively the window may perform another function. This is illustrated in FIG. 3, which shows in its upper part a top view of the window and in its lower part at the left a cross-section according to line A–A' and at the right a cross-section according to line B–B'. The window is concave (CWS') in the direction A–A' and convex (CWS) in the direction B–B'. The window directions can be coupled to an X- and Y-movement of the finger and thus to a, for example, horizontal and vertical movement of a cursor across a display. In this way the window provides a direction indication. As the window is still convex in one direction, grease and dirt particles will be kept away from its central part.

As shown if FIGS. 2 and 3, the measuring BM is preferably focussed, i.e. has its smallest cross-section, not in the plane through the top of window upper surface, but in a plane above this surface. In the plane of the window the cross-section of the measuring beam is sufficient large to prevent irregularities in the window surface, such as scratches, from substantially disturbing the beam.

The influence of such scratches can also be reduced to an acceptable level by a proper choice of the material of the window. A human finger secretes a substance, which consists mainly of water. If a scratch is present in the top surface of the window, the water will fill the scratch. The more the refraction coefficient of the window material is equal to that of water, the less the scratch will be "seen" by the beam, i.e. the less the beam will be influenced by the scratch. As the refraction coefficient of water is low, the window material is preferably a glass with the lowest possible refraction coefficient if this possibility to work off scratches is used.

Figure 4:
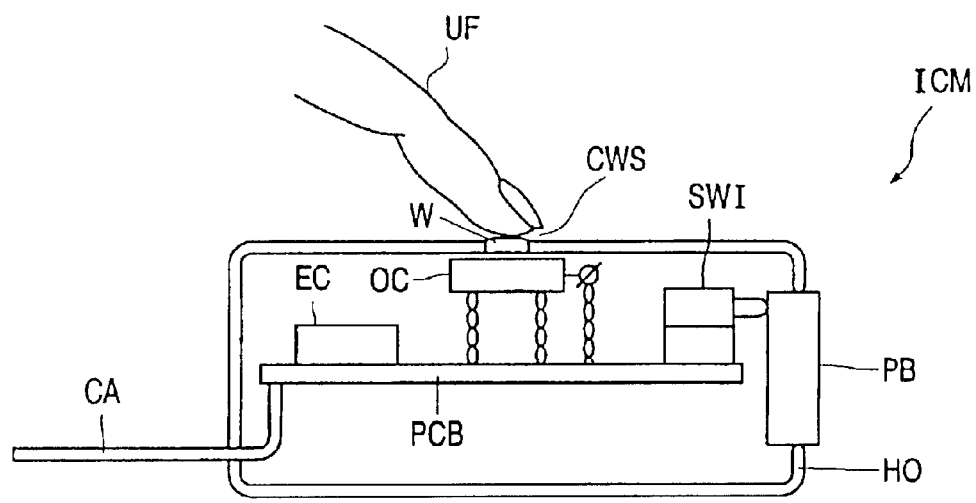
FIG. 4 shows a first, known input device wherein the invention is implemented.

The invention may be used in any optical input device having a transparent window through which a measuring beam passes. An example of such device, an "inverted computer mouse ICM, is shown in FIG. 4, which is mainly a copy of FIG. 5a of EP-A 0 942 285 and differs therefrom in that the window surface is convex, instead of flat. The device comprises an optical "chip" OC a diode laser, at least on diffraction grating and a detector. Chip OC is mounted in a housing HO and views the finger tip through the window W. Input and output leads from chip OC are connected to a printed circuit board PCB on which is mounted electronic circuitry EC. Also mounted on the board PCB is a switch SWI that is activated by a pushbutton PB as in a conventional computer mouse. The device or mouse ICM is conventionally connected to a computer via a cable CA. In this device the principle of homodyne or heterodyne detection is used. A diffraction grating that is arranged close to the window W reflects a portion of the measuring beam to a detector, which portion is used as a local oscillator beam. The interference of this beam and radiation reflected by the finger reaching the detector gives rise to a beat signal from the detector, which signal is determined by the movement of the finger. For further details about this method of measuring reference is made to EP-A 0 942 285.

The optical chip or module OC comprises, besides at least one grating, a collimator lens, a focusing lens and a pinhole diaphragm, which precedes the detector, which elements should be aligned very accurately. As recently proposed by applicant, the number of components in the optical input device can be reduced and its manufacture be simplified by using the principle of diode laser self mixing in this device.

Figure 5A:
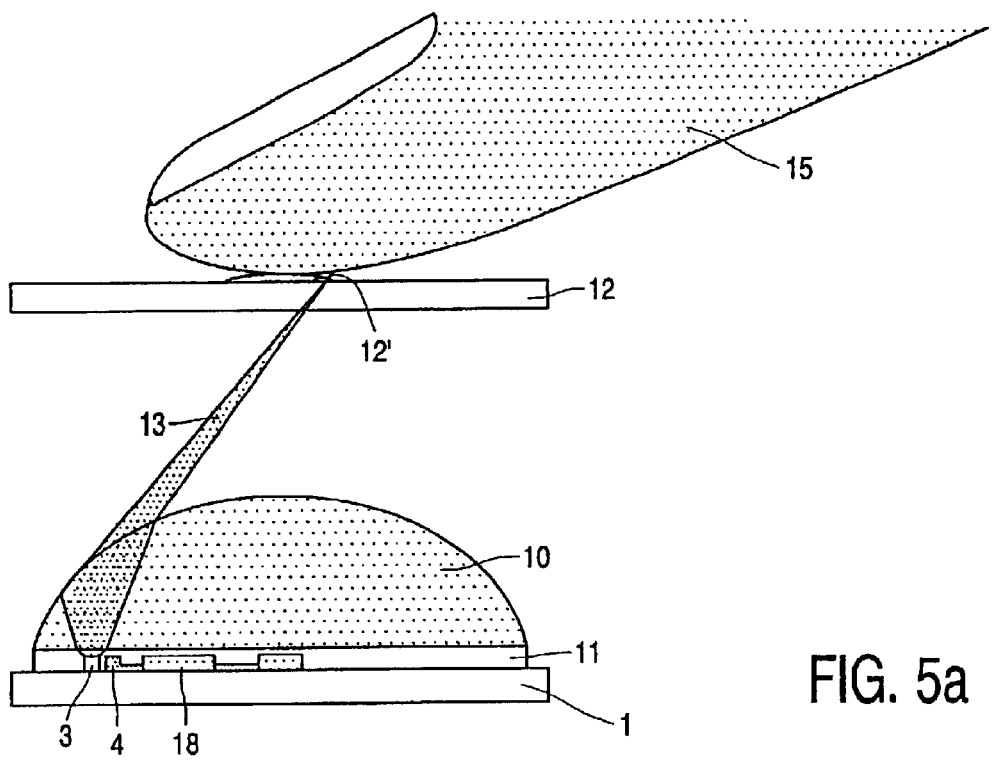
FIG. 5a shows, in cross-section, a first embodiment of a second, recently proposed, input device wherein the invention is implemented.
Figure 5B:
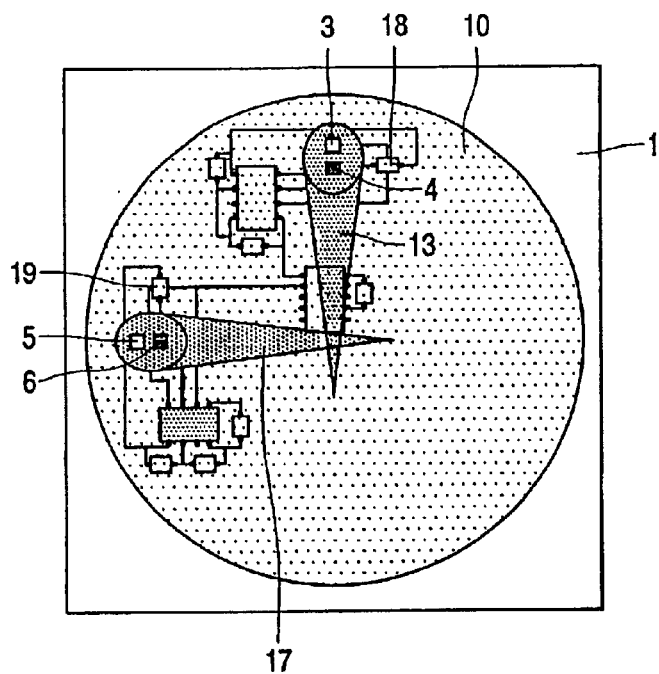
FIG. 5b is a top view of this device.

FIG. 5a is a diagrammatic cross-section of an optical input device, which uses this principle. The device comprises at its lower side a base plate 1, which is a carrier for one or more diode lasers, in this embodiment lasers of the type VCSEL, and one or more detectors, for example photo diodes. In FIG. 5a only one diode laser 3 and its associated photo diode 4 is visible, but usually at least a second diode laser 5 and associated detector 6 is provided on the base plate, as shown in the FIG. 5b top view of the apparatus. The diode lasers 3 and 5 emit laser, or measuring, beams 13 and 17, respectively At its upper side the device is provided with a transparent window 12 across which a human finger 15 is to be moved. A lens 10, for example a plane-convex lens is arranged between the diode lasers and the window. This lens focuses the laser beams 13 and 17 at or near the upper side of the transparent window. If a finger 15 is present at this position, it scatters the beam 13. A part of the radiation of beam 13 is scattered in the direction of the illumination beam 13 and this part is converged by the lens 10 on the emitting surface of the diode laser 3 and re-enters the cavity of this laser. As will be explained hereinafter, the radiation returning in the cavity induces changes in this cavity, which results in, inter alia, a change of the intensity of the laser radiation emitted by the diode laser. This change can be detected by the photo diode 4, which converts the radiation variation into an electric signal, and an electronic circuitry 18 for processing this signal. The illumination beam 17 is also focused on the object, scattered thereby and part of the scattered radiation re-enters the cavity of the diode laser 5. The circuitry 18 and 19, for the signal of the photo diode 6, shown in FIGS. 5a and 5b has only an illustrative purpose and may be more or less conventional. As is illustrated in FIG. 5b, this circuitry is interconnected.

Figure 6:
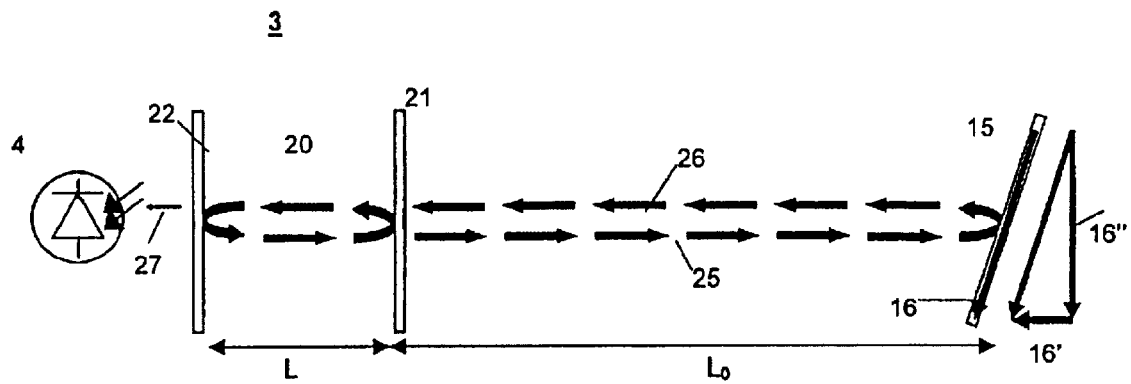
FIG. 6 illustrates the principle of the measuring method of the input device.

FIG. 6 illustrates the principle of the input device and the self-mixing effect when a horizontal emitting diode laser and a monitor photo diode arranged at the rear facet of the laser are used. In this Figure, the diode laser, for example diode laser 3 is schematically represented by its cavity 20 and its front and rear facets, or laser mirrors, 21 and 22, respectively. The cavity has a length L The finger, which movement is to be measured, is denoted by reference numeral 15. The space between this finger and the front facet 21 forms an external cavity, which has a length $L_0$. The laser beam emitted through the front facet is denoted by the reference numeral 25 and the radiation reflected by the finger in the direction of the front facet is denoted by reference numeral 26. Part of the radiation generated in the laser cavity passes through the rear facet and is captured by the photo diode 4.

If the finger 15 moves in the direction of the illumination beam 13, the reflected radiation 26 undergoes a Doppler shift. This means that the frequency of this radiation changes or that a frequency shift occurs. This frequency shift is dependent on the velocity with which the finger moves and is of the order of a few kHz to MHz. The frequency-shifted radiation re-entering the laser cavity interferes with the optical wave, or radiation generated in this cavity, i.e. a self-mixing effect occurs in the cavity. Dependent on the amount of phase shift between the optical wave and the radiation re-entering the cavity, this interference will be constructive or negative, i.e. the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and thus easy to detect. The combination of the self-mixing effect and the Doppler shift causes a variation in the behaviour of the laser cavity; especially its gain, or light amplification, varies.

Figure 7:
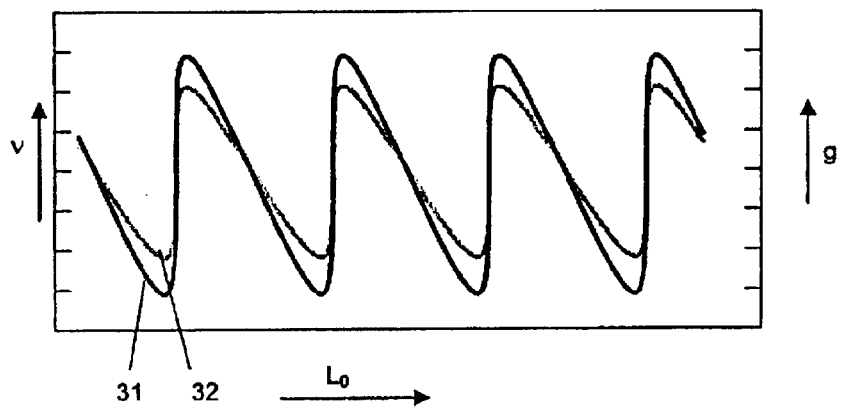
FIG. 7 shows the variation of the optical frequency and of the gain of the laser cavity as a function of the movement of the device and a finger relative to each other.

This is illustrated in FIG. 7. In this Figure, curves 31 and 32 represent the variation of the frequency v of the emitted laser radiation and the variation of the gain g of the diode laser, respectively, as a function of the distance $L_0$ between the finger 15 and the front mirror 21. Both v, g and $L_0$ are in arbitrary units. As the variation of the distance $L_0$ is the result of movement of the finger, the abscissa of FIG. 3 can be re-scaled in a time axis, so that the gain will be plotted as a function of time. The gain variation $\Delta g$ as a function of the velocity v of the finger is given by the following equation:

$$\Delta g = -\frac{K}{L} \cdot \cos \cdot \left\{ \frac{4\pi \cdot \upsilon \cdot v \cdot t}{c} + \frac{4\pi \cdot L_0 \cdot t}{c} \right\}$$

In this equation:
K is the coupling coefficient to the external cavity; it is indicative of the quantity of radiation coupled out of the laser cavity;

$\upsilon$ is the frequency of the laser radiation;
v is the velocity of the finger in the direction of the measuring beam
t is the moment of time, and
c is the light velocity.

The equation can be derived from the theory on the self-mixing effect disclosed in the two articles mentioned herein above. The object surface is moved in its own plane, as is indicated by the arrow 16 in FIG. 6. Because the Doppler shift occurs only for an object movement in the direction of the beam, this movement 16 should be such that it has a component 16' in this direction. Thereby, it becomes possible to measure the movement in an XZ plane, i.e. the plane of drawing of FIG. 6 which movement can be called the X movement. FIG. 6 shows that the object surface has a skew position with respect to the rest of the system. In practice, usually the measuring beam is a skew beam and the movement of the object surface will take place in an XY-plane. The Y-direction is perpendicular to the plane of the drawing in FIG. 6. The movement in this direction can be measured by a second measuring beam, emitted by a second diode laser, and scattered light of which is captured by a second photo diode associated with the second diode laser. A (the) skew illumination beam(s) is (are) obtained by arranging the diode laser(s) eccentrically with respect to the lens 10, as shown in FIG. 5a.

Measuring the variation of the laser cavity gain caused by the finger movement by measuring the intensity of the radiation at the rear laser facet by a monitor diode is the simplest, and thus the most attractive way. Conventionally, this photo diode is used for keeping the intensity of the laser radiation constant, but now it is also used for measuring the movement of the finger.

Figure 8:
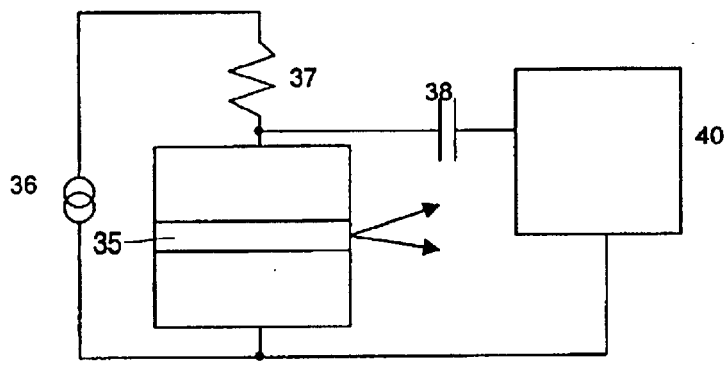
FIG. 8 illustrates a method of measuring this variation.

Another method of measuring the gain variation, and thus the movement of the finger, makes use of the fact that the intensity of the laser radiation is proportional to the number of electrons in the conduction band in the junction of the laser. This number in turn is inversely proportional to the resistance of the junction. By measuring this resistance, the movement of the finger can be determined. An embodiment of this measuring method is illustrated in FIG. 8. In this Figure, the active layer of the diode laser is denoted by the reference numeral 35 and the current source for supplying this laser is denoted by reference numeral 36. The voltage across the diode laser is supplied to an electronic circuit 40 via a capacitor 38. This voltage, which is normalized with the current through the laser, is proportional to the resistance, or impedance, of the laser cavity. The inductance 37 in series with the diode laser forms high impedance for the signal across the diode laser.

Besides the amount of movement, i.e. the distance across which the finger is moved and which can be measured by integrating the measured velocity with respect to time, also the direction of movement has to be detected. This means that it has to be determined whether the finger moves forward or backward along an axis of movement. The direction of movement can be detected by determining the shape of the signal resulting from the self-mixing effect. As shown by graph 32 in FIG. 7, this signal is an asymmetric signal. The graph 32 represents the situation where the finger 15 is moving towards the laser. The rising slope 32' is steeper than the falling slope 32". As described in the above-mentioned article in Applied Optics, Vol. 31, No.8, Jun. 20, 1992, pages 3401–3408, the asymmetry is reversed for a movement of the object away from the laser, i.e. the falling slope is steeper than the rising slope. By determining the type of asymmetry of the self-mixing signal, the direction of movement of the finger can be ascertained. Under certain circumstances, for example for a smaller reflection coefficient of the finger or a larger distance between the finger and the diode laser, it may become difficult to determine the shape or asymmetry of the self-mixing signal.

Figure 9:
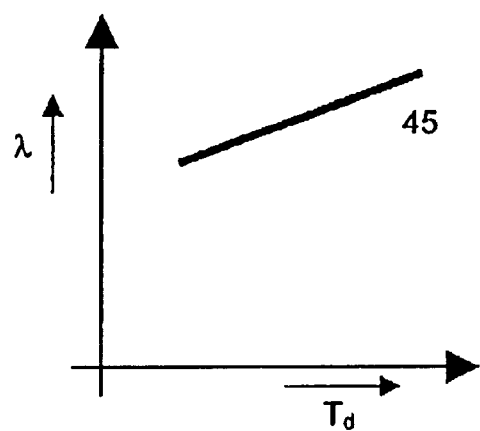
FIG. 9 shows the variation of laser wavelength as a function of the temperature of the laser with optical feedback.

In another, preferred, method of determining the direction of movement, use is made of the fact that the wavelength $\lambda$ of the laser radiation is dependent on the temperature of, and thus the current through, the diode laser. If, for example, the temperature of the diode laser increases, the length of the laser cavity increases and the wavelength of the radiation that is amplified increases. Curve 45 of FIG. 9 shows the temperature ($T_d$) dependency of the wavelength $\lambda$ of the emitted radiation. In this Figure, both the horizontal axis, $T_d$, and the vertical axis, $\lambda$, are in arbitrary units.

Figure 10:
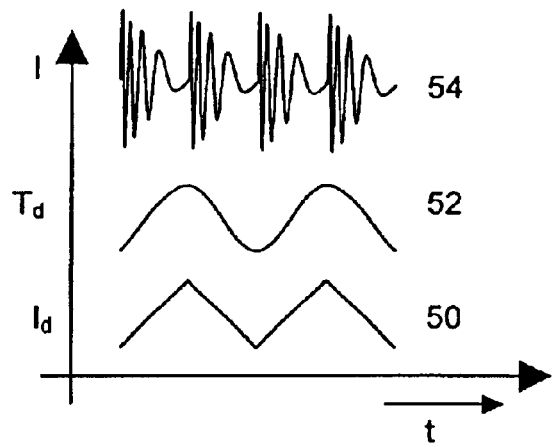
FIG. 10 shows the effect of the use of a periodically varying drive current for a laser.

If, as is shown in FIG. 10, a periodic drive current $I_d$, represented by the graph 50, is supplied to the diode laser, the temperature $T_d$ of the diode laser rises and falls periodically, as shown in graph 52. This results in a standing optical wave in the laser cavity which has a periodically varying frequency and thus a continuously varying phase shift with respect to the radiation reflected by the object and re-entering the cavity with a certain time delay. In every half period of the drive current, there are now successive time segments wherein the diode laser gain is higher and lower, depending on the phase relation of the wave in the cavity and the reflected radiation re-entering the cavity. This results in a time-dependent intensity variation (I) of the emitted radiation as shown in graph 54 of FIG. 10. This graph represents the situation for a stationary, or non-moving, object. The number of pulses in a first half period ½p(a) is equal to the number of pulses in a second half period ½p(b).

A movement of the finger causes a Doppler shift of the radiation re-entering the laser cavity, i.e. this frequency increases or decreases dependent on the direction of movement. A movement of the finger in one direction, the forward direction, causes a decrease of the wavelength of the re-entering radiation, and a movement in the opposite direction causes an increase in the wavelength of this radiation. The effect of the periodic frequency modulation of the optical wave in the laser cavity is that, in case the Doppler shift has the same sign as the frequency modulation in the laser cavity, the effect of Doppler-shifted radiation re-entering the cavity is different from the effect this radiation has in case said frequency modulation and Doppler shift have opposite signs. If the two frequency shifts have the same sign, the phase difference between the wave and the re-entering radiation changes at a slow rate, and the frequency of the resulting modulation of the laser radiation is lower. If the two frequency shifts have opposite signs, the phase difference between the wave and the radiation changes at a faster rate, and the frequency of the resulting modulation of the laser radiation is higher. During a first half period ½p(a) of the driving laser current, the wavelength of the generated laser radiation increases. In the case of a backward moving finger, the wavelength of the re-entering radiation also increases, so that the difference between the frequencies of the wave in the cavity and that of the radiation re-entering this cavity is lower. Thus the number of time segments during which the wavelength of re-entering radiation is adapted to the wavelength of the generated radiation is smaller than in the case of absence of electrical modulation of the emitted laser radiation. This means that, if the finger moves in the backward direction, the number of pulses in the first half period is smaller than if no modulation would be applied. In the second half period ½p(b), wherein the laser temperature and the wavelength of the generated radiation decrease, the number of time segments wherein the wavelength of the re-entering radiation is adapted to that of the generated radiation increases. Thus, for a backward moving finger, the number of pulses in the first half period is smaller than the number of pulses in the second half period. This is illustrated in graph 58 of FIG. 11, which graph shows the intensity $I_b$ of the laser radiation emitted if the object moves in the backward direction. Comparing this graph with graph 54 of FIG. 10 shows that the number of pulses in the first half period has decreased and the number of pulses in the second half period has increased.

Figure 11:
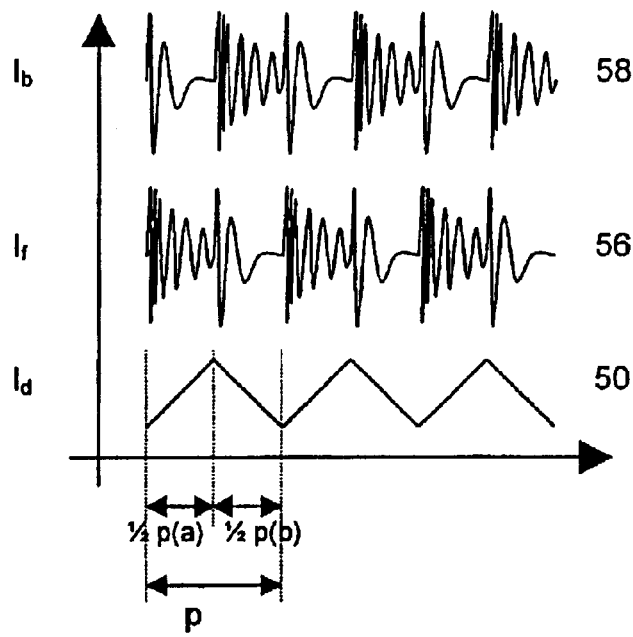
FIG. 11 illustrates how the direction of movement is detected.

It will be clear from the above reasoning that if the finger moves in the forward direction, in which the wavelength of radiation scattered by the finger and re-entering the laser cavity decreases due to the Doppler effect, the number of pulses in a first half period ½p(a) is larger than the number of pulses in a second half period ½p(b). This can be verified by comparing graph 56 of FIG. 11, representing the intensity $I_f$ of the radiation emitted in the case of a forward moving finger. In an electronic processing circuit, the number of photo diode signal pulses counted during the second half period ½p(b) is subtracted from the number of pulses counted during the first half periods ½p(a). If the resulting signal is zero, the finger is stationary. If the resulting signal is positive, the finger moves in the forward direction and if this signal is negative, the finger moves in the backward direction. The resulting number of pulses is proportional to the velocity of the movement in the forward and backward directions, respectively.

Under certain circumstances, for example if the optical path length between the laser and the finger is relatively small and the frequency and amplitude of the electrical modulation are relatively small, whereas the movement to be detected is relatively fast, it may occur that the number of pulses generated by the Doppler effect is higher than the number of pulses generated by the electrical modulation. In such situations the direction of movement can still be detected by comparing the number of pulses during a first half period with the number of pulses during a second half period. However, the velocity is then not proportional to the difference of these two numbers. In order to determine the velocity in such situations, the said two numbers should be averaged and a constant value should be subtracted from the result. The number obtained in this way is a measure for the velocity. A person skilled in the art can easily design an electronic circuit for carrying out this calculation.

Instead of the triangular shaped drive current $I_d$ used in the embodiment described with reference to FIGS. 9 and 10, also a drive current of another shape, such as rectangular shape, may be used.

The method of measuring the velocity and the direction of the finger movement described above can also be used if the gain variation is determined by measuring the variation of the resistance of the diode laser cavity.

The measuring method requires only a small Doppler shift, for example in terms of wavelength, a shift of the order of $1,5.10^{-16}$ m, which corresponds to a Doppler frequency shift of the order of 100 kHz for a laser wavelength of 680 nm.

Figure 12:
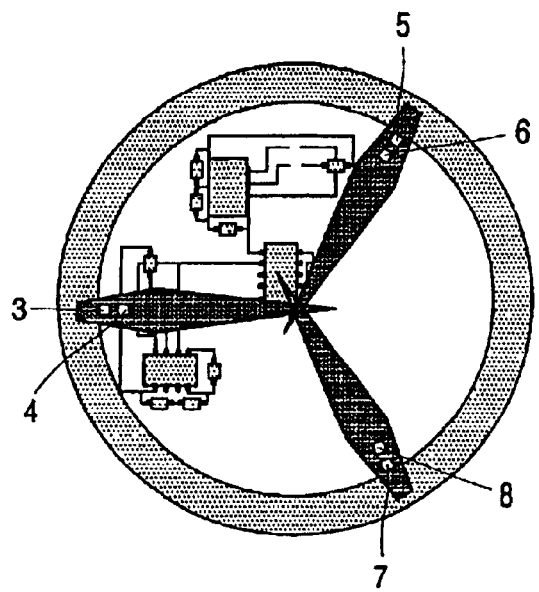
FIG. 12 shows a diagram of an input device with three measuring axes.

Object movements along two perpendicular (X and Y) directions, or measuring axis, in one plane can be measured with the input device of FIGS. 5a and 5b, which device comprises two diode lasers and associated photo diodes in a perpendicular orientation. Adding a third diode laser and an associated photo diode to the device enables this device to measure also the movement along a third, Z-, direction, or measuring axis. The third diode laser may be arranged on the optical axis of the lens 10 so that the third illumination beam is perpendicularly incident on the window 12 and the finger and has no components in the other directions. An optimum measuring signal for the Z direction may then be obtained. In order to increase the reliability and accuracy of the X and Y measuring signals, three diode lasers are preferably arranged on one circle and at a mutual angular distance of 120°. This configuration is shown in FIG. 12 wherein the third diode laser and third photo diode are denoted by the reference numerals 7 and 8, respectively. If the output signals of the photo diodes 4, 6 and 8, or the resistance measuring signals, are represented by $S_4$, $S_6$ and $S_8$ respectively, the finger velocities $V_x$, $V_y$ and $V_z$ along the X, Y and Z measuring axes, respectively can be calculated, for example, as follows:

$$V_x = 2\,S_4 - S_6 - S_8$$

$$V_y = \sqrt{3}.(S_8 - S_6)$$

$$V_z = 1/\sqrt{2}.(S_4 + S_6 + S_8)$$

The electronic circuit for performing this calculation comprises summing and subtracting elements and is relatively easy to implement.

The values of the velocities and, by integration with respect to time duration of movement, the distance of the movement in the X and Y directions obtained in this way are more reliable and accurate, because they are the result of averaging the output signals of at least two photo diodes. Movement errors, or unwanted movements, such as slightly lifting the finger, have a similar effect on the output signals of the photo-diodes. As the movements along the X and Y measuring axes are determined by subtracting output signals from each other, the influence of an unwanted movement on the X- and Y measuring signal is eliminated. Only the Z-measuring signal, $V_z$, which is obtained by adding the output signals of the three photo diodes is indicative of an up/down movement of the finger.

In applications wherein the movement of a human finger in the Z direction and the input device relative to each other is used to perform a click function, it suffices to detect that such a movement takes place. An accurate measuring of the displacement of the finger is not necessary so that the Z-measurement may be rather rough. Even the direction of the movement need not be detected.

Hardly any requirements have to be set to the structure or to the reflection coefficient of the finger, which is moved relative to the input device. It has been demonstrated that also the relative movement of a piece of blank paper and the device can be easily measured.

From an optical point of view, the dimensions of the optical module may be very small. The size of the input device is mainly determined by the amount of electronics that has to be incorporated in the device and by the aspect of easy mass manufacturing. In practical embodiments, the window has a size of 3 mm to 5 mm squared. Because of the measuring principle used in this device, its components need not be aligned accurately, which is a great advantage for mass production.

In the embodiment of FIGS. 5a and 5b, the lens 10 may be made of glass or a transparent plastic material, like polycarbonate (PC) or polymethyl methacrylate (PMMA). Such a lens can be fixed to the substrate, carrying the diode lasers, the photo diodes and processing circuitry, by means of a transparent glue layer 11, for example of epoxy. For this embodiment, it is assumed that the diode lasers radiate in the vertical direction, so that these lasers may be of the VCSEL type. Such a laser can easily be placed on the base plate by means of a wire bounding technique.

Figure 13A:
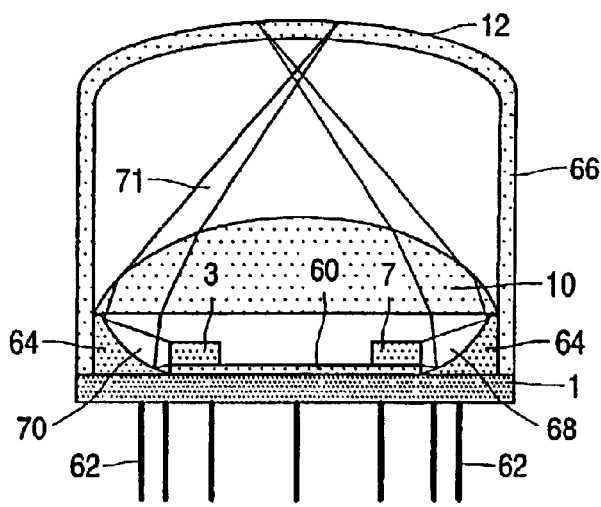
FIGS. 13a and 13b show a second embodiment of the second input device.
Figure 13B:
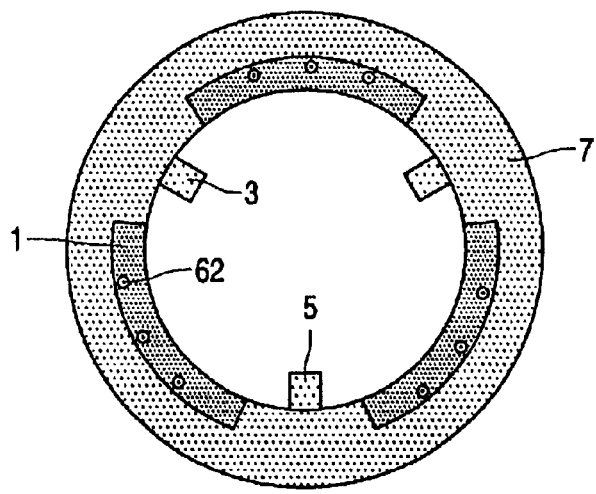

Preferably more conventional side emitting diode lasers, which have a horizontal cavity, are used because they are considerably cheaper. Such a laser can be mounted in such a way that it radiates in the vertical direction. For example, the laser can be mounted on a small table. It is, however, also possible to mount side-emitting diode lasers in such a way that they emit in the horizontal direction. FIG. 13a is a vertical cross-section of an embodiment of the input device with such lasers and FIG. 13b is a top view of the lower part of this device. In these Figures, 1 is the base, or housing, plate from which electrical contact pins 62 protrude. This base plate has such heat-conduction that it can function as a cooling element for the diode lasers. The electronic circuitry, shown schematically in the FIGS. 5a, 5b and 12, may be mounted on a layer 60 of silicon or another material, which layer forms a circuit board. Also the embodiment of FIGS. 5a and 5b may comprise such a layer. Elements 3, 5 and 7 are the side emitting diode lasers. For each of these lasers, a reflecting member 64 is provided, which reflect the horizontally emitted beam 68, 70 from the diode lasers in the vertical direction through the lens 10 towards the window 12 at the top of the device. Preferably the reflecting elements have a spherical shape so that they have also some optical power and convert the incident diverging beam 68, 70 into a less divergent, or a collimated, or even slightly converging, beam. The optical power of the lens 10 can then be smaller than that of the lens 10 in the embodiment of FIGS. 5a and 5b. Also in the embodiment of FIGS. 13a and 13b, the lens 10 may be a glass lens, but is preferably a plastic lens. A plastic lens is cheaper and lighter than a glass lens and is very suitable in this application because no stringent optical requirements are set to this lens. A cap 66, which may be made of plastics and is provided with a convex transparent window 12, forms the housing of the device together with the housing plate 1. A portion of the lens power needed to focus the measuring beams may be included in the cap 66. The three, or in case only two diode lasers are used the two, reflecting members may be constituted by one plastics ring which is covered by a reflecting coating. Said ring may form an integral part of the base plate 1. The input device then mainly consists of plastic material and is composed of only three constructional parts, which can easily be assembled. These parts are: the base plate 1, which is provided with the reflecting ring, the contact pins 62 and the diode lasers and associated photo diodes, the lens 10 and the cap 66 provided with the window 12.

Figure 14:
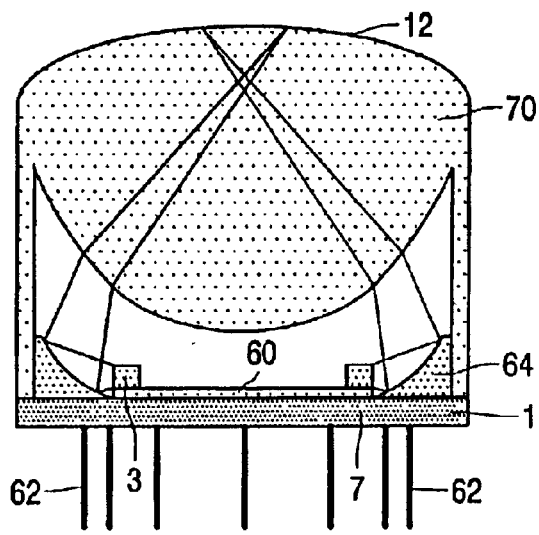
FIG. 14 shows a third embodiment of this device.

FIG. 14 shows a preferred embodiment of the input device wherein a further integration of parts has been carried out. In this embodiment, the cap 66 and the lens 10 of the embodiment of FIG. 13a are replaced by a single plastic element 70 the lower side of which is curved towards the base plate. This curved surface has the same refractive effect on the illumination beams as the lens 10 in FIG. 13a. A top view of the lower part of the embodiment of FIG. 14 is not shown because this part is the same as that of FIGS. 13a and 13b. The embodiment shows in FIG. 14 is composed of only two constructional parts and is even easier to assemble than the embodiment shows in FIGS. 13a and 13b.

In the embodiments shows in FIGS. 12, 13a, 13b, 14, 15a and 15b the measuring beams are not focused in the plane of the window. The measuring beams have a sufficient large cross-section in this plane to prevent scratches and residual dust and greas on this plane from substantially disturbing the measuring beams. As these beam originate from different positions at the base plate level, the illumination beams form illumination spots at different positions in the action plane, for example the plane of the window. The illumination beams and their scattered radiation are sufficient spatially separated, so the crosstalk between the different measuring axes is no problem in the present input device. If necessary, a residual crosstalk can be reduced by using diode lasers with slightly different wavelengths. For this purpose, a wavelength difference of a few nm is already sufficient.

Another possibility of eliminating crosstalk is, to use of a control drive for the diode lasers, which causes only one laser to be activated at any moment. A multiplexing driving circuit, which circuit alternately activates the different diode lasers, may constitute such a control drive. Such multiplexing circuit allows to monitor of two or three diode lasers by means of one detector, or photodiode, which is arranged within reach of each of the diode lasers and is used in a time sharing mode. An additional advantage of the embodiment with such a driving circuit is that the space needed for the circuitry and the electric power consumption of the device is reduced.

Figure 15A:
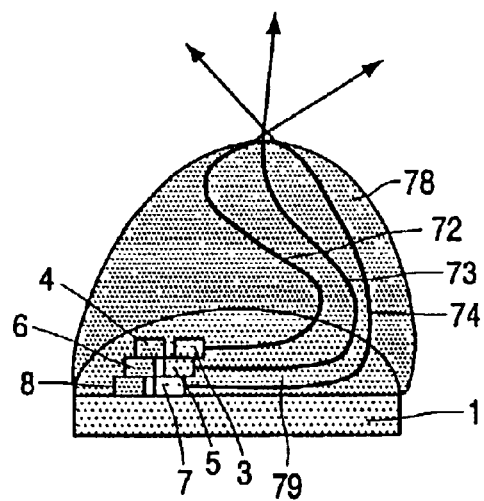
FIGS. 15a and 15b show a fourth embodiment of this device.
Figure 15B:
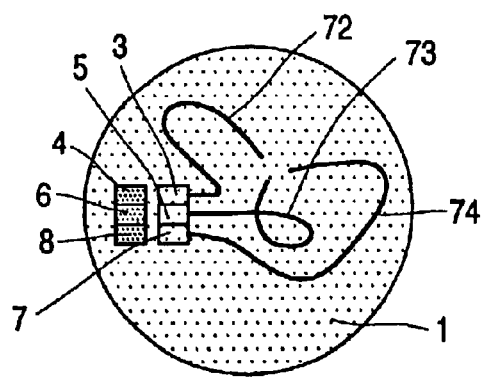

FIGS. 15a and 15b show an embodiment of the input device wherein the illumination beams are guided to the window by optical fibres. FIG. 15a is a vertical cross-section and FIG. 15b is a top view of this embodiment. The input ends of the fibres 72, 73 and 74 are optically coupled to the diode lasers 3,5 and 7, respectively, in a well-known way. All output ends of the fibres are located at the window of the device. The fibres may be embedded in a cap 78 of solid material, for example, epoxy or another transparent or non-transparent material. Each of these fibres forms an isolator for the radiation guided by this fibre, both for the illumination radiation from the associated diode laser and the scattered radiation returning to this laser. As a consequence, the possibility of crosstalk between the different measuring axes is very small to nought. Other advantages of fibres are that they are flexible, which increases the design possibilities, and that they can transport the radiation over arbitrary distances so that the diode lasers and photodiodes can be arranged at quite remote distances from the window of the input device. In the embodiment of FIGS. 15a and 15b, the diode lasers and associated photo diodes are arranged close together. These elements may be arranged in a separate compartment 79, as shown in FIG. 15a, which compartment may be of the same material as the cap, or of another material.

Instead of fibres, other light guides may be used, for example, channels in a body of transparent or non-transparent material.

The embodiments of FIGS. 12–15b may be provided with two, instead of three, diode lasers. This will be the case if the input device has to measure only X and Y movements and a Z measurement, for example for a click function, is not needed. Instead of diode lasers, other small laser devices may be used and other small radiation-sensitive devices may replace the photo diodes.

As the input device described above can be manufactured at low costs, it is very suitable to be implemented in mass consumer apparatus. Because of its very small size and light-weight, this device can easily be integrated in existing apparatus, thereby increasing the capabilities of these apparatus without substantially increasing their costs and weight and without changing their original design.

Figure 16:
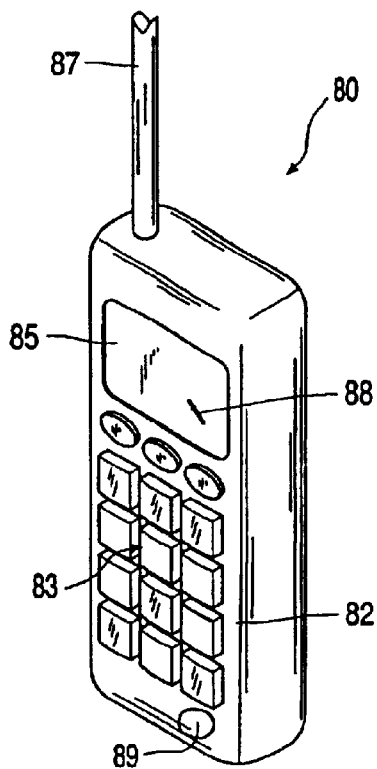
FIG. 16 shows a mobile phone equipped with the input device.

FIG. 16 shows a first and important application of the new input device, namely in a mobile, or cellular, telephone apparatus 80. The front surface of this apparatus is provided with a key entry section 82, which comprises a number of button switches 83 for dial entry and other functions. A display device 85 is disposed above the section 82 and an antenna 87 is provided on the top surface of the phone 80. When a dial, such as a ten-key dial, or another command is entered from the button switches 83, information relating to the entered command is transmitted via a transmitting circuit, not shown, in the phone and the antenna to a base station of a telephone company. Other commands entered via the button switches may be processed in the phone circuitry to activate different functions built in the phone circuitry, such as selecting a given phone number of a stored list or sending a given message from of a table of standard messages. By providing the phone apparatus with an input device and additional circuitry to control the movement of a cursor 88 across the display device 85, some of the existing functions can be performed in an easier way and new functions can be created. The input device 89, only the window of which is shown in FIG. 16, may be arranged at several positions on the phone, for example below the button switches, as shown in FIG. 16, or on one of the side surfaces. Preferably the window of the input device is located at one of the positions where the fingers are usually placed to hold the phone apparatus. The circuitry of the apparatus is able to display a menu of functions and a movement of a finger across the input window of the device 89 can move the cursor 88 to a given function. A single movement of the finger in a direction perpendicular to the window, i.e. click, can activate this function.

The input device can provide great advantages when integrated in mobile phone provided with a standard protocol, such as the WAP protocol or the I-mode Internet protocol. By means of such a protocol, the apparatus can be used as a terminal for a worldwide communication network, such as the Internet. As this becomes more and more widely spread and used, there is a need for new end user apparatus. First candidates are TV sets equipped with a set top box and mobile phones. For the new purpose, these apparatus should be equipped with a small input device that fits well in, for example, the TV remote control unit or the mobile phone. The present input device perfectly meets these requirements.

Figure 17:
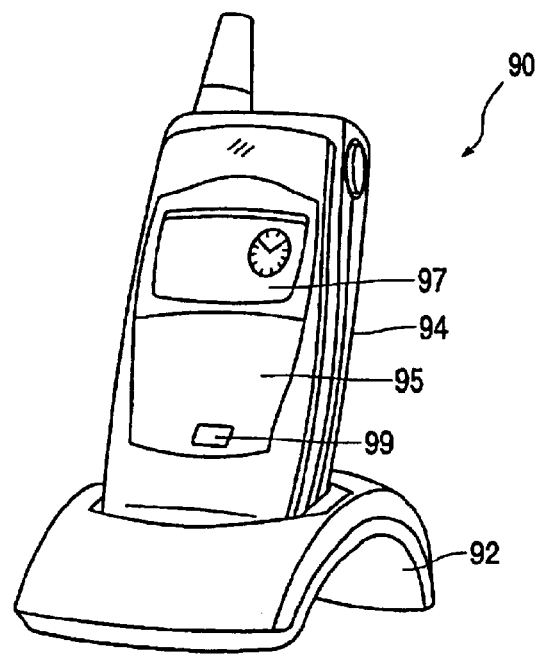
FIG. 17 shows a cordless phone equipped with the input device.

This input device can also be used in a cordless phone apparatus for the same purposes as in the mobile phone apparatus. A cordless phone apparatus 90 is shown in FIG. 17. This apparatus is composed of a base station 92, which is connected to a phone or cable network and the movable apparatus 94 which can be used within an area with a radius of, for example, less than 100 m from the base station. Apparatus 94 comprises a key entry section 95 and a display device 97. In a similar way as described for the mobile phone apparatus, the apparatus 94 can be provided with an input device 99 as described above. Also in FIG. 17, only the window of the input device is shown. Like the mobile phone apparatus, the apparatus 94 should be small and lightweight. Implementation of the present input device in the cordless phone apparatus provides the same advantages as its implementation in the mobile phone apparatus, especially if the cordless apparatus is provided with, for example the WAP protocol or the I-mode protocol for access to the Internet.

Figure 18:
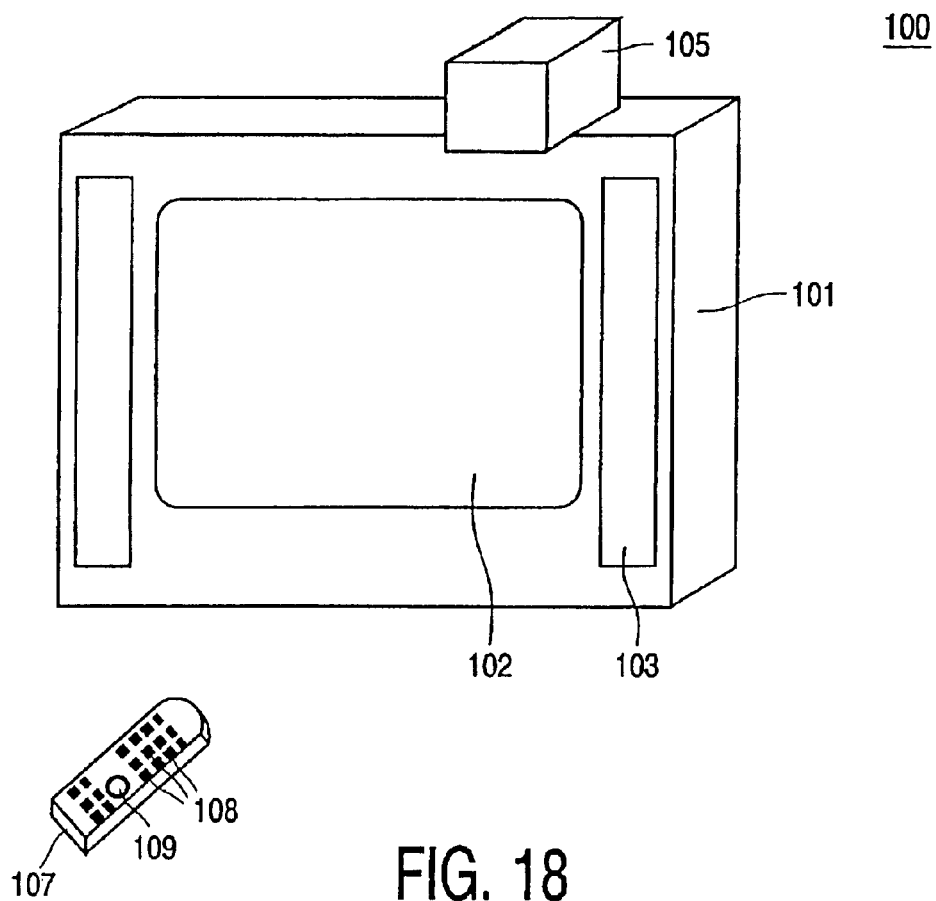
FIG. 18 shows a TV set equipped with the input device.

A conventional TV set 100, shown in FIG. 18 and comprising a receiver and display apparatus 101 and a remote control unit 107, can be made suitable for Internet communication, by adding a set top box 105 to it. This box provides access to the Internet via a phone or cable network, and converts the signal received from the Internet into a signal that can be processed by the TV set in order to display the Internet information. As a user of the TV Internet should have the input device for Internet commands at hand, this input device should be integrated in the remote control.

According to the invention, an optical input device 109 as described herein before is built in the remote control unit 107. The device 109, of which only the window is shown, may be arranged between the conventional buttons of the remote control unit or at any other position within reach of any of the human fingers holding the remote control unit.

Figure 19:
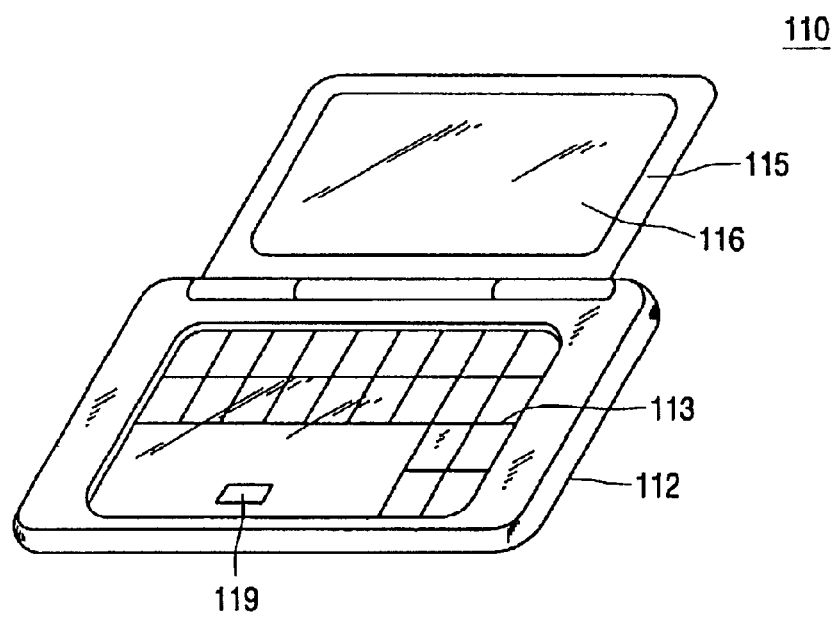
FIG. 19 shows a laptop computer equipped with the input device.

The input device of the present invention may also be used in a computer configuration to replace a conventional hand-driven track-ball mouse or a mouse pad. FIG. 19 shows a portable computer, known as notebook or laptop, comprising a base portion 112 and a cover portion 115 with an LCD display 116. The base portion accommodates the different computer modules and the keyboard 113. In this keyboard, an optical input device 119 of the present invention is arranged which replaces the conventional mouse pad. The input device may be arranged at the position of the conventional mouse pad or at any other easily accessible position. If the input device is used to measure the movement of a finger in only two directions and thus has to perform only the functions of the conventional mouse pad, it needs to comprise only two diode lasers. Preferably an input device is used which comprises three diode lasers and thus has a click function so that it replaces also a conventional click button of the notebook.

A hand-held, or palmtop, computer is a smaller version of the notebook. Also such a palmtop computer may be provided with an optical input device according to the invention, for example to replace a pen for touching the display screen, which pen is usually applied to select a function of a displayed menu. The optical input device may be arranged in the keyboard of the palmtop computer, but also at the inner side of the cover.

Figure 20:
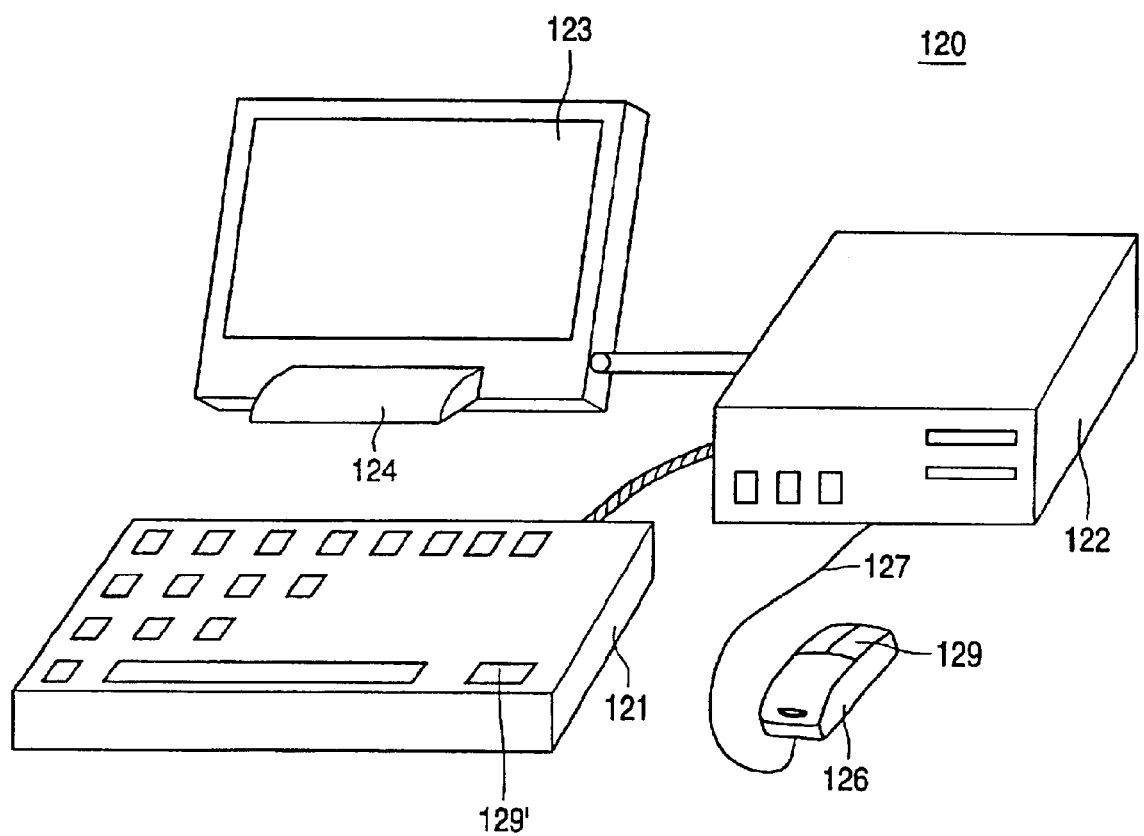
FIG. 20 shows a desktop computer equipped with the input device.

FIG. 20 shows a desktop computer configuration 120 wherein the optical input device can be applied in several ways to replace the conventional trackball mouse. The computer configuration is composed of a keyboard 121, a computer box 122 and a monitor 123. The monitor may be a flat LCD monitor fixed in a support 124, as shown in the Figure, or a CRT monitor. Preferably an optical input device 129 is integrated in the keyboard so that a separate mouse 126 and its cable to the computer box are no longer needed.

In the computer configurations described above, the input device may be arranged in the display portion, instead of in the keyboard portion, for example in the cover 115 of the laptop computer of FIG. 19 or in the cover of a palmtop computer. The input device may also be incorporated in displays other than computer displays.

As already remarked, the input device of, for example the mobile phone of FIG. 16 can be used in an up down scroll switch for scrolling menu charts. Such an input device may also have the capability to determine a click, which activates a menu which is pointed at by a cursor controlled by the up down switch. Such an input device can be easily built of discrete components, which allows fast new developments.

Figure 21:
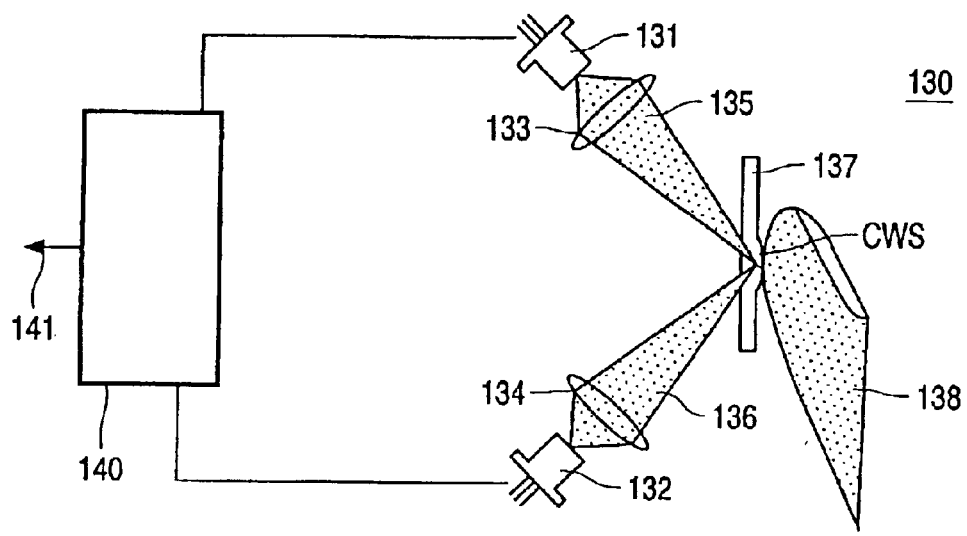
FIGS. 21 and 22 show a first embodiment of an input device for scrolling and clicking.

FIG. 21 shows a first embodiment of a scroll and click input device 130. It comprises two laser/diode units 131, 132, which each comprises a diode laser and a photodiode. Instead of such units also separate diode lasers and photo diodes may be used. In each of the paths of the radiation emitted by the units 131, 132 a lens 133, 134, respectively is arranged, which focuses radiation beams 135 and 136 of the associated units 131 and 132 in an action plane 137, which may be the convex surface CWS of a window 142. This window may form part of the housing 139 of the apparatus in which the device is used, for example a mobile phone as shown in side view in FIG. 22. The laser/diode units and the associated lenses may be so arranged that the chief rays of the beams 135 and 136 are at opposite angles with respect to the normal to the window 142, for example at angles of +45° and −45°, respectively.

A human finger 138 is moved across the action plane for a scrolling and/or clicking action. As described herein above, both actions cause a Doppler shift in the radiation reflected by the finger towards the laser/diode units 131 and 132. The output signals of the detectors of these units are supplied to signal processing and laser drive electronic circuitry 140. This circuitry evaluates the movements of the controlling finger 138 and supplies information about these movements at its output 141. The laser/diode units 131 and 132, the lenses 135 and 136, the window 142 and the electronic circuitry 140 and software may be integrated in one module. This module is placed as such in the mobile phone or in another apparatus, which should be provided with a scrolling and clicking function. It is also possible to implement the input device with discrete elements. Especially part of the signal processing may be carried out by a micro controller or other controlling means which forms part of the mobile phone or other apparatus, such as a remote control, a cordless phone or a portable computer.

As described herein before a movement of a finger or other object towards an away from the laser/diode units may be detected by modulating the laser currents and counting the pulses received by the detectors. From the output signals $Sign_1$ and $Sign_2$ of these detectors, which represent velocities of the finger along the chief rays of the beams 135 and 136, respectively, the velocity ($V_{scroll}$) parallel to the window and the velocity ($V_{click}$) perpendicular to the window can be calculated as follows:

$$V_{scroll} = \frac{1}{2}\sqrt{2} \cdot (Sign_1 - Sign_2)$$

$$V_{click} = \frac{1}{2}\sqrt{2} \cdot (Sign_1 + Sign_2)$$

Figure 22:
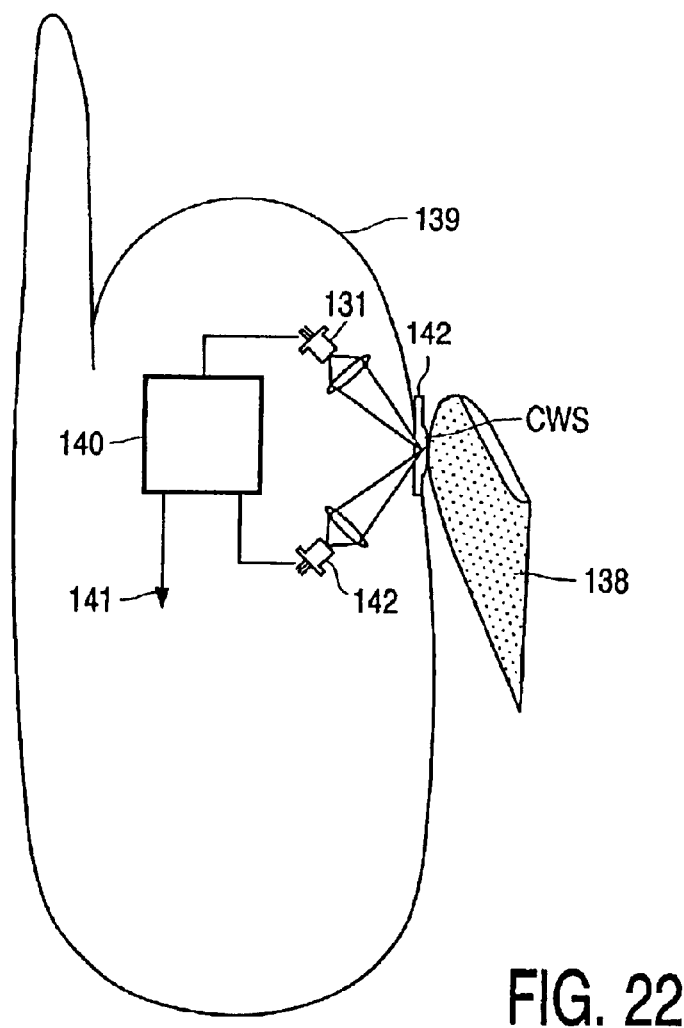
Figure 23:
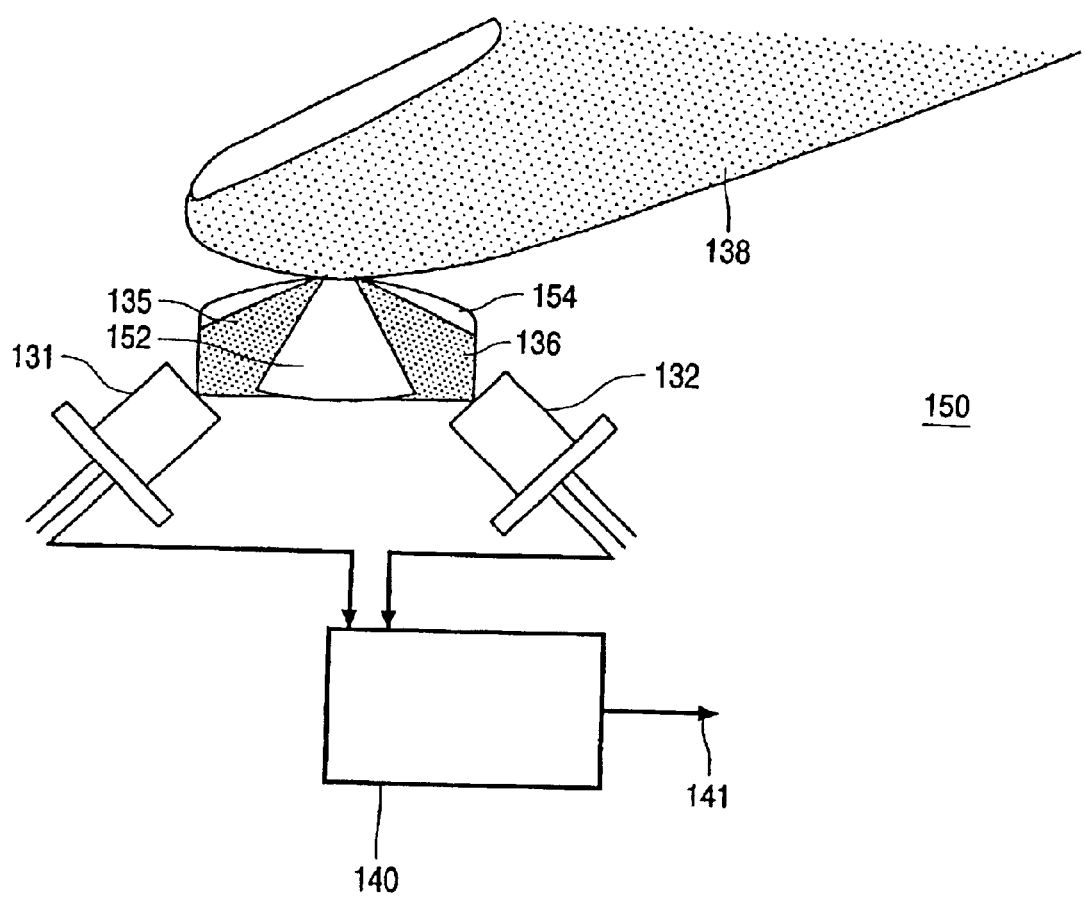
FIG. 23 shows a second embodiment of such a device.

FIG. 23 shows a second embodiment of a scroll and click input device 150. This embodiment differs from that of FIGS. 21 and 22 in that the two lenses 133 and 134 and the window 142 has been replaced by a single component 152. This element focuses both beams 135 and 136 on its convex upper surface 154, which forms a window.

If the input device of FIGS. 21–23 needs to monitor only a scrolling function, only one diode laser, lens and detector is required in principle.

What is claimed is:

1. An optical input device for measuring a movement of a finger along at least one measuring axis, said optical input device comprising:

a transparent window for facilitating the movement of the finger along the at least one measuring axis; and a laser operable to generate a measuring beam in a direction of the transparent window, wherein an action plane associated with said transparent window is defined by the measuring beam converging into the finger, and wherein an upper surface of said transparent window is convex in at least one of two mutually perpendicular directions in the action plane.

2. The optical input device of claim 1, wherein the upper surface of said transparent window is convex in the two mutually perpendicular directions in the action plane.

3. The optical input device of claim 1, wherein the upper surface of said transparent window is convex in a direction of the two mutually perpendicular directions in the action plane; and wherein the upper surface of said transparent window is concave in a second direction of the two mutually perpendicular directions in the action plane.

4. The optical input device of claim 1, wherein the measuring beam is focused in a plane remote from the upper surface of said transparent window.

5. The optical input device of claim 1, further comprising:

optical means for converging the measuring beam into the finger.

6. The optical input device of claim 1, further comprising:

converting means for converting at least a portion of a reflection of the measuring beam from the finger into an electrical signal indicative of the movement of the finger along the at least one measuring axis.

7. The optical input device of claim 1, further comprising:

means entering at least a portion of a reflection of the measuring beam from the finger into a cavity of said laser; and means for measuring any changes in an operation of said cavity of said laser due to the at least the portion of the reflection of the measuring beam from the finger entering into the cavity of said laser.

8. An apparatus, comprising:

a display screen for displaying a cursor; and an optical input device for controlling a movement of the cursor by measuring a movement of a finger along at least one measuring axis, said optical input device including a transparent window for facilitating the movement of the finger along the at least one measuring axis, and a laser operable to generate a measuring beam in a direction of the transparent window, wherein an action plane associated with said transparent window is defined by the measuring beam converging into the finger, and wherein an upper surface of said transparent window is convex in at least one of two mutually perpendicular directions in the action plane.

9. The apparatus of claim 8, wherein the upper surface of said transparent window is convex in the two mutually perpendicular directions in the action plane.

10. The apparatus of claim 8, wherein the upper surface of said transparent window is convex in a direction of the two mutually perpendicular directions in the action plane; and wherein the upper surface of said transparent window is concave in a second direction of the two mutually perpendicular directions in the action plane.

11. The apparatus of claim 8, wherein the measuring beam is focused in a plane remote train the upper surface of said transparent window.

12. The apparatus of claim 8, further comprising:

optical means for converging the measuring beam into the finger.

13. The apparatus of claim 8, further comprising:

converting means for converting at least a portion of a reflection of the measuring beam from the finger into an electrical signal indicative of the movement of the finger along the at least one measuring axis.

14. The apparatus of claim 8, further comprising:

means for entering at least a portion of a reflection of the measuring beam from the finger into a cavity of said laser; and means for measuring any changes in an operation of said cavity of said laser due to the at least the portion of the reflection of the measuring beam from the finger entering into the cavity of said laser.

15. The apparatus of claim 8, wherein said display screen is housed within one of a telephone, a computer, a remote control unit, a display device, a keyboard, and a mouse.

16. An optical input device for measuring a movement of a finger along at least one measuring axis, said optical input device comprising:

a transparent window for facilitating the movement of the finger along the at least one measuring axis, wherein an upper surface of said transparent window is convex in at least one of two mutually perpendicular directions;

laser means for generating at least one measuring beam in at least one direction of the transparent window;

optical means for converging the at least one measuring beam into the finger; and converting means for converting at least a portion of a reflection of the at least one measuring beam from the finger into an electrical signal indicative of the movement of the finger along the at least one measuring axis.

17. An apparatus, comprising:

a display screen for displaying a cursor; and an optical input device for controlling a movement of the cursor by measuring a movement of a finger along at least one measuring axis, said optical input device including a transparent window for facilitating the movement of the finger along the at least one measuring axis, wherein an upper surface of said transparent window is convex in at least one of two mutually perpendicular directions, laser means for generating at least one measuring beam in at least one direction of the transparent window, optical means for converging the at least one measuring beam into the finger, and converting means for converting at least a portion of a reflection of the at least one measuring beam from the finger into an electrical signal indicative of the movement of the finger along the at least one measuring axis.

18. The apparatus of claim 17, wherein said display screen is housed within one of a telephone, a computer, a remote control unit, a display device, a keyboard, and a mouse.

* * * * *